US012348832B2

(12) United States Patent
Choi et al.

(10) Patent No.: US 12,348,832 B2
(45) Date of Patent: Jul. 1, 2025

(54) SERVER AND SYSTEM INCLUDING THE SAME

(71) Applicant: LG ELECTRONICS INC., Seoul (KR)

(72) Inventors: Yookyoung Choi, Seoul (KR); Jaekyung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/008,292

(22) PCT Filed: Jun. 4, 2020

(86) PCT No.: PCT/KR2020/007273
§ 371 (c)(1),
(2) Date: Dec. 5, 2022

(87) PCT Pub. No.: WO2021/246552
PCT Pub. Date: Dec. 9, 2021

(65) Prior Publication Data
US 2023/0209147 A1 Jun. 29, 2023

(51) Int. Cl.
*H04N 21/24* (2011.01)
*H04N 21/41* (2011.01)
(Continued)

(52) U.S. Cl.
CPC ..... *H04N 21/4882* (2013.01); *H04N 21/4126* (2013.01); *H04N 21/47214* (2013.01)

(58) Field of Classification Search
None
See application file for complete search history.

(56) References Cited

U.S. PATENT DOCUMENTS 9,544,651 B2 1/2017 Ueno
2010/0071015 A1* 3/2010 Tomioka ............ H04N 21/4263 725/110

(Continued)

FOREIGN PATENT DOCUMENTS

KR 1020060095665 9/2006
KR 1020070099930 10/2007

(Continued)

OTHER PUBLICATIONS

PCT International Application No. PCT/KR2020/007273, International Search Report dated Feb. 26, 2021, 3 pages.

(Continued)

*Primary Examiner* — Brian T Pendleton
*Assistant Examiner* — Jean D Saint Cyr
(74) *Attorney, Agent, or Firm* — LEE, HONG, DEGERMAN, KANG & WAIMEY

(57) ABSTRACT

The present disclosure relates to a server and a system including the same. The server according to an embodiment of the present disclosure includes: a communication unit configured to perform communication through a network; a storage unit configured to store reservation data including a title, broadcasting date, and time slot of content; and a controller, wherein, when a first signal for setting a watching reservation for specific content is received from an image display apparatus through the communication unit, the controller checks at least one content provider that provides a service related to watching of the specific content, generates reservation data for the specific content and stores the reservation data in the storage unit, and when a first time point corresponding to the broadcasting date and time slot of the specific content arrives, transmits a notification message, which contains data on at least one of the at least one content provider, that is related to watching of the specific content to (Continued)

START
Receive a watching reservation signal — S501
Check content provider — S502
Check the broadcasting date and time slot for each content provider — S503
Generate and store reservation data — S504
S505 Broadcasting time point arrives? No / Yes
S506 Image display apparatus is turned on? No / Yes
Transmit a notification message — S507
END the image display apparatus. Various other embodiments are possible.

16 Claims, 15 Drawing Sheets

(51) Int. Cl.

| | |
|---|---|
| ***H04N 21/422*** | (2011.01) |
| ***H04N 21/442*** | (2011.01) |
| ***H04N 21/458*** | (2011.01) |
| ***H04N 21/472*** | (2011.01) |
| ***H04N 21/488*** | (2011.01) |

(56) References Cited

U.S. PATENT DOCUMENTS

2011/0197230 A1 8/2011 Yu et al.
2016/0088359 A1* 3/2016 Vaidhyanathan .... H04N 21/435 725/40
2016/0366468 A1 12/2016 Seo
2019/0335228 A1* 10/2019 Sprenger ............ H04N 21/4532
2020/0053428 A1 2/2020 Seely et al.

FOREIGN PATENT DOCUMENTS

KR 1020100038945 4/2010
KR 1020160085663 7/2016

OTHER PUBLICATIONS

European Patent Office Application Serial No. 20938557.4, Search Report dated Jan. 5, 2024, 8 pages.

* cited by examiner

SERVER AND SYSTEM INCLUDING THE SAME

CROSS-REFERENCE TO RELATED APPLICATIONS

This application is the National Stage filing under 35 U.S.C. 371 of International Application No. PCT/KR2020/007273, filed on Jun. 4, 2020, the contents of which are all incorporated by reference herein in their entirety.

TECHNICAL FIELD

The present disclosure relates to a server and a system including the same.

BACKGROUND ART

An image display apparatus is a device having a function of displaying an image that a user can watch, and a user can watch a broadcast through the image display apparatus. For example, the image display apparatus may include a Television (TV), a monitor, a projector, and the like that have a liquid crystal display LCD using a liquid crystal or an OLED display using an organic light emitting diode OLED.

Recently, a digital TV service using a wired or wireless network communication network has become common, and the digital TV service provides various services that cannot be provided by an existing analog broadcasting service. Here, the digital TV service may include not only digital terrestrial broadcasting, but also digital cable broadcasting, digital satellite broadcasting, Internet Protocol Television (IPTV) service, terrestrial and satellite DMB service, and VOD service provided through a communication network.

Meanwhile, if a user reserves a broadcasting date and a time of broadcast content that the user desires to watch, a conventional image display apparatus provides a watch reservation function to switch a channel to a broadcasting channel corresponding to a relevant broadcasting content at the start time of reserved broadcasting, and may watch a desired broadcast content without missing it by using the watch reservation function of the image display apparatus.

However, since a conventional watching reservation function just simply switches the channel of an image display apparatus, in a situation where a user is absent at the time of the broadcast or it is difficult to watch broadcast content through the image display apparatus, there is a problem that the practical benefit of the watching reservation function disappears.

In addition, recently, various Over The Top (OTT) operators has been provided live broadcasting contents through a network communication network like existing broadcasters, and the number of users who watch broadcasting contents by using OTT service is also increasing.

However, in the case of OTT operators, since it provides a function related to an OTT service only to users logged in to their respective services, if a user is not logged in to a specific OTT service, there is a problem of not receiving the benefits of functions provided by a specific OTT service. In addition, since OTT operators provide their own services independently, the watching reservation set by a user in a specific OTT service cannot be used in other OTT service at all, and there is also a problem that the watching reservation function provided by the existing image display apparatus does not affect the OTT service.

DISCLOSURE

Technical Problem

The present disclosure has been made in view of the above problems, and provides a server that can easily set a watching reservation for various content providers that provide a service related to watching of broadcast content, and a system including the same.

The present disclosure further provides a server that operates so that a user can watch broadcast content at a scheduled broadcasting start time, even when the user is absent or difficult to watch broadcast content through an image display apparatus, and a system including the same.

The present disclosure further provides a server that operates so that a user can watch broadcast content without forgetting, even when the user did not watch the broadcast content reserved for watching live or the broadcast time has elapsed, and a system including the same.

Technical Solution

In an aspect, there is provided a server including: a communication unit configured to perform communication through a network; a storage unit configured to store reservation data including a title, broadcasting date, and time slot of content; and a controller, wherein, when a first signal for setting a watching reservation for specific content is received from an image display apparatus through the communication unit, the controller checks at least one content provider that provides a service related to watching of the specific content, generates reservation data for the specific content and stores the reservation data in the storage unit, and when a first time point corresponding to the broadcasting date and time slot of the specific content arrives, transmits a notification message, which contains data on at least one of the at least one content provider, that is related to watching of the specific content to the image display apparatus.

In another aspect, there is provided a system including a server and an image display apparatus, wherein the server checks at least one content provider that provides a service related to watching of a specific content, when a first signal for setting a watching reservation for the specific content is received from an image display apparatus through a communication unit, generates and stores reservation data, which contains a title, broadcasting date, and time slot of the specific content, for the specific content, and when a first time point corresponding to the broadcasting date and time slot of the specific content arrives, transmits a notification message, which contains data on at least one of the at least one content provider, that is related to watching of the specific content to the image display apparatus, wherein the image display apparatus transmits the first signal to the server according to a user input, and outputs a first screen related to watching of the specific content, based on data of a content provider contained in the notification message, when the notification message is received from the server.

Advantageous Effects

The effects of a server and a system including the same according to the present disclosure are described as follows.

According to various embodiments of the present disclosure, when a user sets a watching reservation for specific broadcasting content, a server checks and manages information on content providers, respectively, and when the broadcasting time arrives, data of content providers is aggregated and provided to a user, the user can easily set a watching reservation for various content providers at once, thereby improving user convenience.

In addition, according to various embodiments of the present disclosure, since data of content providers related to watching reservations is provided also to a user's mobile device, even when a user is absent or is difficult to watch broadcasting content through the image display apparatus, thereby satisfying a user's demand for watching broadcasting content.

In addition, according to various embodiments of the present disclosure, if a user did not watch broadcast content reserved for watching live, or even if the broadcasting time of broadcast content has elapsed, data for a content provider is transmitted to an image display apparatus according to a certain condition, thereby reminding a user of the watching of the broadcasting content to improve the user's satisfaction with the watching reservation function.

Further scope of applicability of the present disclosure will become apparent from the following detailed description. However, it should be understood that the detailed description and specific embodiments such as preferred embodiments of the present disclosure are given by way of example only, since various changes and modifications within the spirit and scope of the present disclosure may be clearly understood by those skilled in the art.

MODE FOR INVENTION

Figure 1:
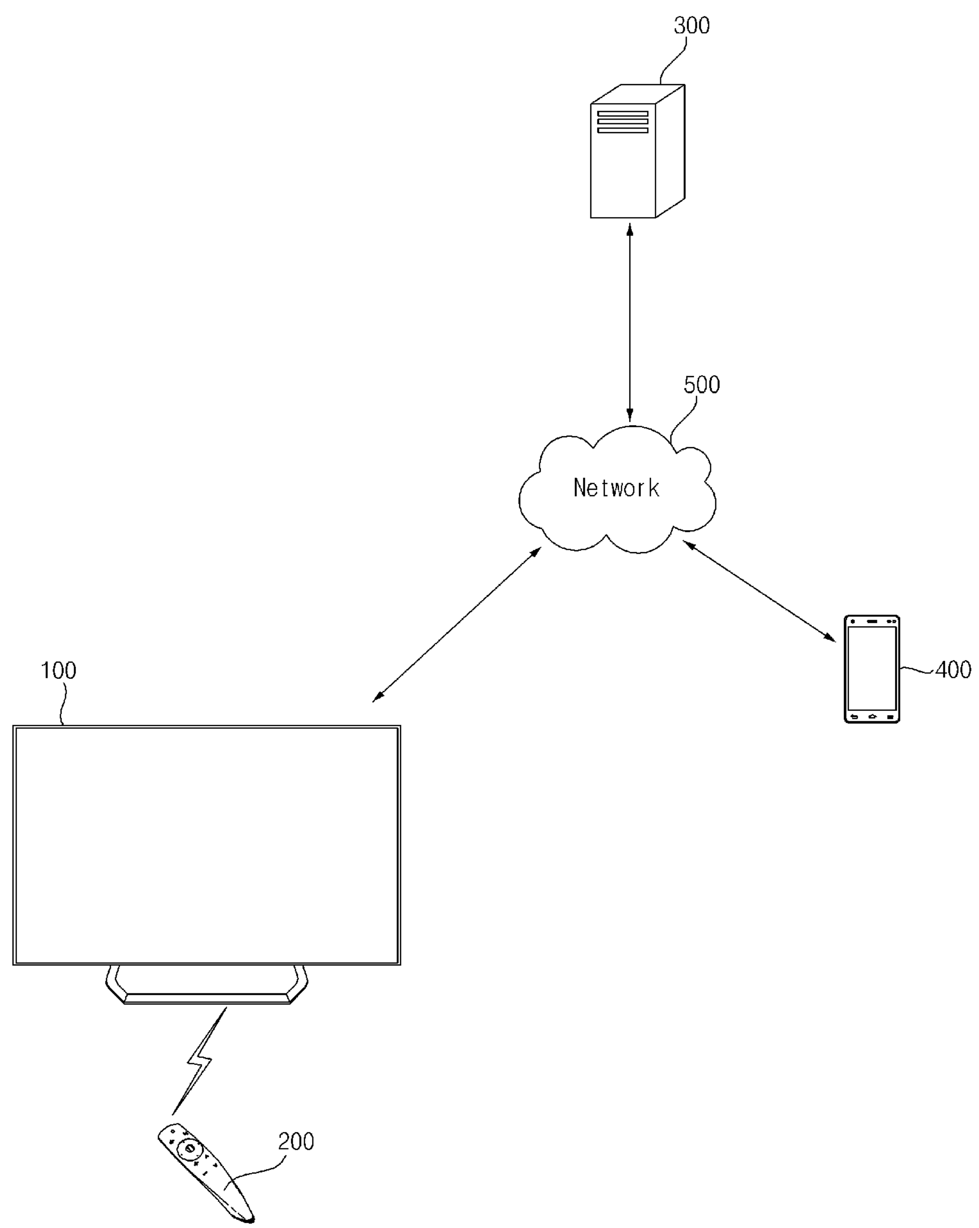
FIG. 1 is a diagram illustrating a system according to an embodiment of the present disclosure.

Reference will now be made in detail to the embodiments of the present disclosure, examples of which are illustrated in the accompanying drawings. To clearly and briefly describe the present disclosure, a part without concerning to the description is omitted in the drawings, and the same or like reference numerals in the specification denote the same elements.

The suffixes "module" and "unit" of elements herein are used for convenience of description and thus may be used interchangeably and do not have any distinguishable meanings or functions. Thus, the "module" and the "unit" may be interchangeably used.

Throughout this specification, the terms such as "include" or "comprise" may be construed to denote a certain characteristic, number, step, operation, constituent element, or a combination thereof, but may not be construed to exclude the existence of or a possibility of addition of one or more other characteristics, numbers, steps, operations, constituent elements, or combinations thereof.

It will be understood that, although the terms "first", "second", "third" etc. may be used herein to describe various elements, these elements should not be limited by these terms. These terms are only used to distinguish one element from another element.

FIG. 1 is a diagram illustrating a system, according to various embodiments of the present disclosure.

Referring to FIG. 1, a system 10 may include an image display apparatus 100, a remote control device 200, a server 300 and/or a server 400.

The image display apparatus 100 may be a device that processes and outputs an image. The image display apparatus 100 is not particularly limited as long as it can output a screen corresponding to an image signal, such as a TV, a notebook computer, and a monitor.

The image display apparatus 100 may receive a broadcast signal, process it, and output a signal-processed broadcast image. When the image display apparatus 100 receives a broadcast signal, the image display apparatus 100 may correspond to a broadcast receiving apparatus.

The image display apparatus 100 may receive a broadcast signal wirelessly through an antenna, or may receive a broadcast signal by wire through a cable. For example, the image display apparatus 100 may receive a terrestrial broadcast signal, a satellite broadcast signal, a cable broadcast signal, an IPTV broadcast signal, and the like.

The remote control device 200 may be connected to the image display apparatus 100 by wire and/or wirelessly to provide various control signals to the image display apparatus 100. At this time, the remote control device 200 may include a device that establishes a wired or wireless network with the image display apparatus 100, and transmits various control signals to the image display apparatus 100 through the established network, or receives a signal related to various operations processed by the image display apparatus 100 from the image display apparatus 100.

For example, various input devices such as a mouse, a keyboard, a space remote control, a trackball, and a joystick may be used as the remote control device 200. The remote control device 200 may be named as an external device, and it should be noted that the external device and the remote control device may be used interchangeably as needed. The image display apparatus 100 may be connected to only a single remote control device 200 or simultaneously connected to two or more remote control devices 200, thereby changing an object displayed on a screen or adjusting the state of a screen, based on a control signal provided from each remote control device 200.

The image display apparatus 100 may communicate with the server 300 via a network 500 such as the Internet, and may transmit and receive signals including data with the server 300.

The image display apparatus 100 may transmit data related to an operation performed according to a user input to the server 300, and the server 300 may process data received from the image display apparatus 100, and may transmit data related to the result of processing the data to the image display apparatus 100.

A mobile device 400 may be a device that receives a user input and operates according to the received user input. For example, the mobile device 400 may be a mobile terminal such as a smart phone, a notebook computer, personal digital assistants (PDA), a portable multimedia player (PMP), and a wearable device.

The mobile device 400 may communicate with the server 300 via the network 500, and transmit/receive a signal including data with the server 300.

The image display apparatus 100 and/or the mobile device 400 may access the network 500 by using a cellular communication that uses at least one of Long-term evolution (LTE), LTE Advance (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like.

Figure 2:
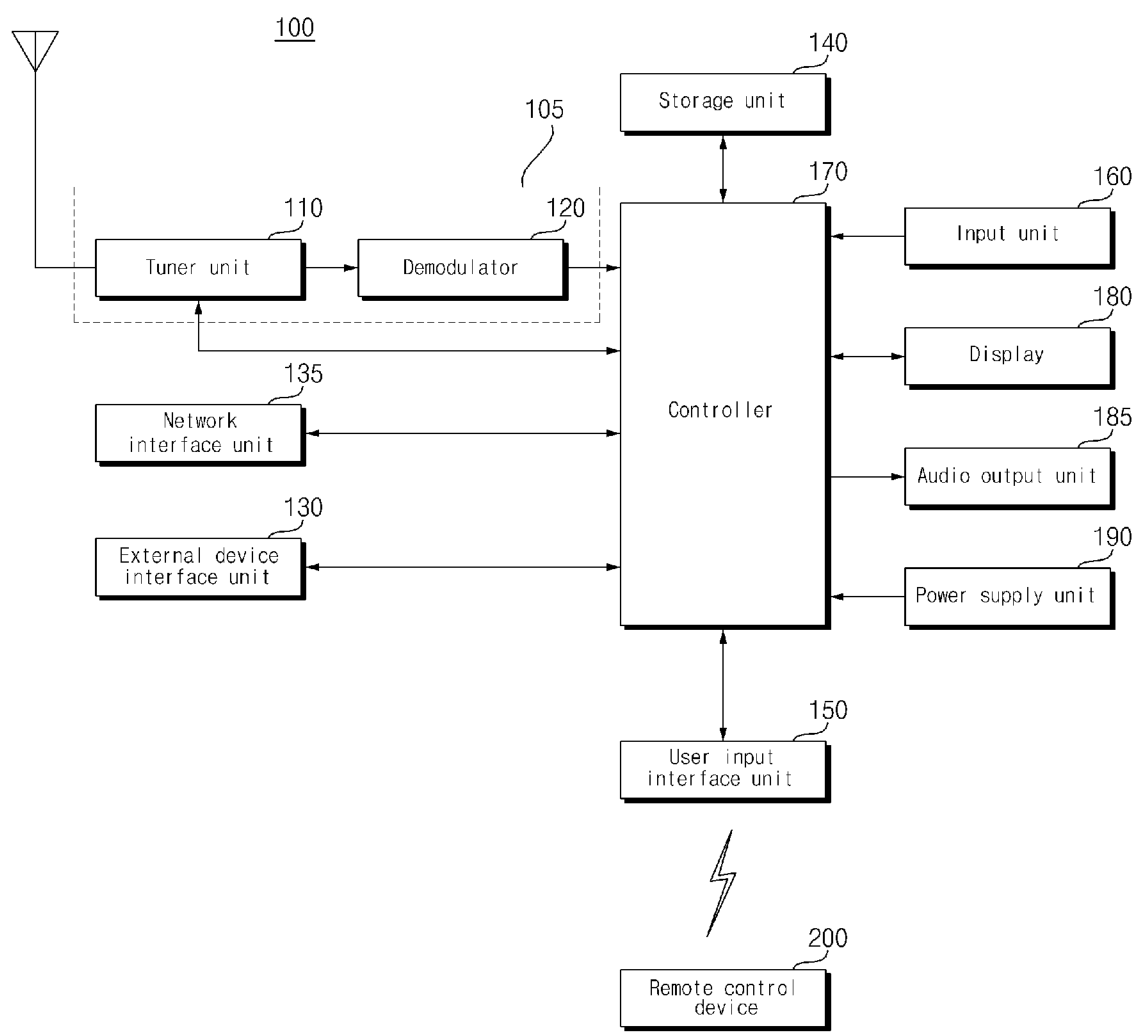
FIG. 2 is an example of an internal block diagram of an image display apparatus of FIG. 1.

FIG. 2 is an internal block diagram of the image display apparatus of FIG. 1.

Referring to FIG. 2, the image display apparatus 100 may include a broadcast receiving unit 105, an external device interface unit 130, a network interface unit 135, a storage unit 140, a user input interface unit 150, an input unit 160, a controller 170, a display 180, an audio output unit 185, and/or a power supply unit 190.

The broadcast receiving unit 105 may include a tuner unit 110 and a demodulator 120.

Meanwhile, unlike the drawing, it is also possible that the image display apparatus 100 includes only a broadcast receiving unit 105 and an external device interface unit 130, among the broadcast receiving unit 105, the external device interface unit 130, and the network interface unit 135. That is, the image display apparatus 100 may not include the network interface unit 135.

The tuner unit 110 may select a broadcast signal corresponding to a channel selected by a user or all pre-stored channels, among broadcast signals received through an antenna (not shown) or a cable (not shown). The tuner unit 110 may convert the selected broadcast signal into an intermediate frequency signal, a baseband image, or a voice signal.

For example, the tuner unit 110 may convert the selected broadcast signal into a digital IF signal (DIF) when the selected broadcast signal is a digital broadcast signal, and may convert the selected broadcast signal into an analog baseband image or voice signal (CVBS/SIF) when the selected broadcast signal is an analog broadcast signal. That is, the tuner unit 110 may process a digital broadcast signal or an analog broadcast signal. The analog baseband image or voice signal (CVBS/SIF) output from the tuner unit 110 may be directly input to the controller 170.

Meanwhile, the tuner unit 110 may sequentially select broadcast signals of all broadcast channels stored through a channel storage function among the received broadcast signals, and convert them into an intermediate frequency signal, a baseband image, or a voice signal.

Meanwhile, the tuner unit 110 may include a plurality of tuners in order to receive broadcast signals of a plurality of channels. Alternatively, a single tuner that simultaneously receives broadcast signals of a plurality of channels is also possible.

The demodulator 120 may receive the digital IF signal (DIF) converted by the tuner unit 110 and perform a demodulation operation.

The demodulator 120 may output a stream signal TS after performing demodulation and channel decoding. In this case, the stream signal may be a signal obtained by multiplexing an image signal, a voice signal, or a data signal.

The stream signal output from the demodulator 120 may be input to the controller 170. After performing demultiplexing and image/voice signal processing, the controller 170 may output an image through the display 180 and output a voice through the audio output unit 185.

The external device interface unit 130 may transmit or receive data with a connected external device. To this end, the external device interface unit 130 may include an A/V input/output unit (not shown).

The external device interface unit 130 may be connected to an external device such as a Digital Versatile Disk (DVD), Blu-ray, game device, camera, camcorder, computer (laptop), and set-top box, by wire/wireless, and may perform an input/output operation with the external device.

In addition, the external device interface unit 130 may receive a control signal related to the operation of the image display apparatus 100 from the remote control device 200, or may transmit data related to the operation of the image display apparatus 100 to the remote control device 200, by establishing a communication network with various remote control devices 200 as shown in FIG. 1.

The A/V input/output unit may receive image and voice signals from an external device. For example, the A/V input/output unit may include an Ethernet terminal, a USB terminal, a Composite Video Banking Sync (CVBS) terminal, a component terminal, an S-video terminal (analog), a Digital Visual Interface (DVI) terminal, a High a Definition Multimedia Interface (HDMI) terminal, a Mobile High-definition Link (MHL) terminal, a RGB terminal, a D-SUB terminal, an IEEE 1394 terminal, an SPDIF terminal, a Liquid HD terminal, and the like. A digital signal input through these terminals may be transmitted to the controller 170. In this case, the analog signal input through the CVBS terminal and the S-video terminal may be converted into a digital signal through an analog-to-digital converter (not shown) and transmitted to the controller 170.

The external device interface unit 130 may include a wireless communication unit (not shown) for short-range wireless communication with other electronic device. Through this wireless communication unit, the external device interface unit 130 may exchange data with an adjacent a mobile terminal. For example, the external device interface unit 130 may receive device information, executing application information, application image, and the like from a mobile terminal in a mirroring mode.

The external device interface unit 130 may perform short-range wireless communication by using Bluetooth, Radio Frequency Identification (RFID), Infrared Data Association (IrDA), Ultra-Wideband (UWB), ZigBee, and the like.

The network interface unit 135 may provide an interface for connecting the image display apparatus 100 to a wired/wireless network including an Internet network.

The network interface unit 135 may include a communication module (not shown) for connection with the wired/wireless network 300. For example, the network interface unit 135 may include a communication module for Wireless LAN (WLAN) (Wi-Fi), Wireless broadband (Wibro), World interoperability for microwave access (Wimax), High Speed Downlink Packet Access (HSDPA), and the like.

The network interface unit 135 may transmit or receive data with other user or other electronic device, through a connected network or other network linked to the connected network.

The network interface unit 135 may receive web content or data provided by a content provider or network operator. That is, the network interface unit 135 may receive contents such as movie, advertisement, game, VOD, and broadcast signal provided from a content providers or network provider through a network, and information related thereto. Here, the content may include video, image, audio, or a combination thereof. In addition, the content may include at least broadcast content, advertising content, digital video recorder (DVR) content, video on demand (VOD) content, UGC content, or a combination thereof.

The network interface unit 135 may receive an update file and update information of firmware provided by a network operator, and transmit data to Internet or a content provider or a network operator.

The network interface unit 135 may select and receive a desired application from among applications open to the public, through a network.

The storage unit 140 may store a program for each signal processing and control in the controller 170, or may store a signal-processed image, voice, or data signal. For example, the storage unit 140 may store application programs designed for the purpose of performing various tasks that can be processed by the controller 170, and upon request of the controller 170, may selectively provide some of the stored application programs.

The program stored in the storage unit 140 is not particularly limited as long as it can be executed by the controller 170.

The storage unit 140 may perform a function for temporarily storing an image, voice, or data signal received from an external device through the external device interface unit 130.

The storage unit 140 may store information on a certain broadcast channel through a channel storage function such as a channel map.

FIG. 2 illustrates an embodiment in which the storage unit 140 is provided separately from the controller 170, but the scope of the present disclosure is not limited thereto, and the storage unit 140 may be included in the controller 170.

The storage unit 140 may include at least one of a volatile memory (e.g. DRAM, SRAM, SDRAM, etc.), a non-volatile memory (e.g. a flash memory, a hard disk drive (HDD), or a solid state drive (SSD), etc.). In various embodiments of the present disclosure, the storage unit 140 and the memory may be used interchangeably.

The user input interface unit 150 may transmit a signal input by a user to the controller 170, or may transmit a signal from the controller 170 to a user.

For example, the user input interface unit 150 may transmit/receive a user input signal such as power on/off, channel selection, and screen setting from the remote control device 200, may transmit a user input signal input from a local key (not shown) such as a power key, a channel key, a volume key, and a setting value to the controller 170, may transmit a user input signal input from a sensor unit (not shown) that senses a user's gesture to the controller 170, or may transmit a signal from the controller 170 to the sensor unit.

The input unit 160 may be provided in one side of the main body of the image display apparatus 100. For example, the input unit 160 may include a touch pad, a physical button, and the like.

The input unit 160 may receive various user commands related to the operation of the image display apparatus 100, and may transmit a control signal corresponding to the input command to the controller 170.

The input unit 160 may include at least one microphone (not shown), and may receive a voice through the microphone.

The controller 170 may include at least one processor, and may control the overall operation of the image display apparatus 100 by using the processor included therein. Here, the processor may be a general processor such as a central processing unit (CPU). Obviously, the processor may be a dedicated device such as an ASIC or other hardware-based processor.

The controller 170 may generate and output a signal for an image or voice output by demultiplexing a stream input through the tuner unit 110, the demodulator 120, the external device interface unit 130, or the network interface unit 135, or processing the demultiplexed signals.

The display 180 converts an image signal, a data signal, an OSD signal, a control signal processed by the controller 170, or an image signal, a data signal, and a control signal received from the external device interface unit 130 to generate a driving signal.

The display 180 may include a display panel (not shown) provided with a plurality of pixels.

The plurality of pixels provided in the display panel may include RGB sub-pixels. Alternatively, the plurality of pixels provided in the display panel may include a sub-pixel of RGBW. The display 180 may generate a driving signal for a plurality of pixels by converting an image signal, a data signal, an OSD signal, a control signal, etc. processed by the controller 170.

The display 180 may be a plasma display panel (PDP), a liquid crystal display (LCD), an organic light emitting diode (OLED), a flexible display, and the like, and a three-dimensional display (3D display) may be possible. The 3D display 180 may be divided into a non-glasses type and a glasses type.

Meanwhile, the display 180 may be configured as a touch screen, and used as an input device in addition to an output device.

The audio output unit 185 receives the voice-processed signal from the controller 170 and outputs it as a voice.

The image signal processed by the controller 170 may be input to the display 180 and displayed as an image corresponding to a pertinent image signal. In addition, the image signal processed by the controller 170 may be input to an external output device through the external device interface unit 130.

The voice signal processed by the controller 170 may be outputted as an audio to the audio output unit 185. In addition, the voice signal processed by the controller 170 may be input to an external output device through the external device interface unit 130.

Although not shown in FIG. 2, the controller 170 may include a demultiplexer, an image processing unit, and the like. This will be described later with reference to FIG. 3.

In addition, the controller 170 may control overall operations in the image display apparatus 100. For example, the controller 170 may control the tuner unit 110 to tune a channel selected by a user or a broadcast corresponding to a pre-stored channel.

In addition, the controller 170 may control the image display apparatus 100 according to a user command input through the user input interface unit 150 or an internal program.

Meanwhile, the controller 170 may control the display 180 to display an image. In this case, the image displayed on the display 180 may be a still image or a moving image, and may be a 2D image or a 3D image.

Meanwhile, the controller 170 may enable a certain 2D object to be displayed in the image displayed on the display 180. For example, the object may be at least one of an accessed web screen (newspaper, magazine, etc.), an electronic program guide (EPG), various menus, a widget, an icon, a still image, a moving picture, and a text.

Meanwhile, the image display apparatus 100 may further include a photographing unit (not shown). The photographing unit may photograph a user. The photographing unit may be implemented with a single camera, but is not limited thereto, and may be implemented with a plurality of cameras. Meanwhile, the photographing unit may be embedded in the image display apparatus 100 in the upper portion of the display 180 or may be disposed separately. Image information photographed by the photographing unit may be input to the controller 170.

The controller 170 may recognize the location of a user, based on the image photographed by the photographing unit. For example, the controller 170 may determine the distance (z-axis coordinate) between a user and the image display apparatus 100. In addition, the controller 170 may determine the x-axis coordinates and the y-axis coordinates in the display 180 corresponding to the user's location.

The controller 170 may detect the user's gesture based on each or a combination of an image photographed by the photographing unit or a signal sensed from the sensor unit.

The power supply unit 190 may supply a corresponding power throughout the image display apparatus 100. In particular, it may supply power to the controller 170 that can be implemented in the form of a system on chip (SOC), the display 180 for displaying an image, and the audio output unit 185 for outputting audio.

Specifically, the power supply unit 190 may include a converter (not shown) that converts AC power into DC power, and a Dc/Dc converter (not shown) that converts the level of DC power.

The remote control device 200 may transmit a user input to the user input interface unit 150. To this end, the remote control device 200 may use Bluetooth, Radio Frequency (RF) communication, Infrared Radiation communication, Ultra-wideband (UWB), ZigBee method, etc. In addition, the remote control device 200 may receive an image, voice, or data signal output from the user input interface unit 150, and display it in the remote control device 200 or output as a voice.

Meanwhile, the above-described image display apparatus 100 may be a digital broadcasting receiver capable of receiving a fixed type or mobile type digital broadcasting.

Meanwhile, the block diagram of the image display apparatus 100 shown in FIG. 2 is just a block diagram for an embodiment of the present disclosure, and each component of the block diagram may be incorporated, added, or omitted according to the specifications of the image display apparatus 100 actually implemented.

That is, two or more components may be combined into a single component, or a single component may be subdivided into two or more components as needed. In addition, the function performed in each block is for explaining the embodiment of the present disclosure, and a specific operation or device does not limit the scope of the present disclosure.

Figure 3:
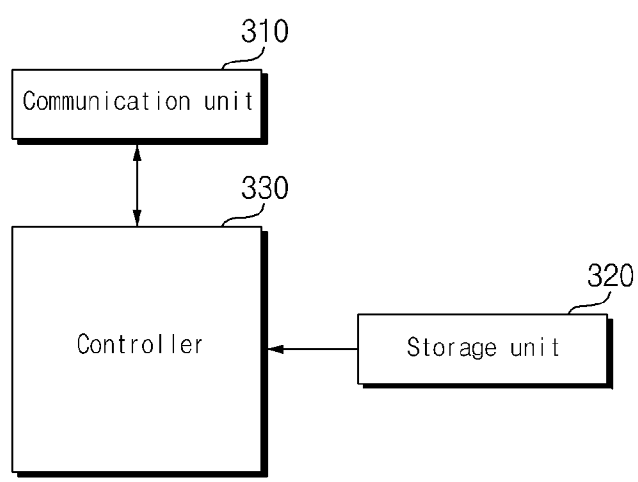
FIG. 3 is an example of an internal block diagram of a server of FIG. 1.

FIG. 3 is an example of an internal block diagram of the server of FIG. 1.

Referring to FIG. 3, the server 300 may include a communication unit 310, a storage unit 320, and/or a controller 330.

The communication unit 310 may include at least one communication module for connection with the network 500, and may communicate with the image display apparatus 100 and/or the mobile device 400 by accessing the network 500.

The storage unit 320 may store programs for processing and controlling each signal in the controller 330, or may store signal-processed data signal. For example, the storage unit 320 may store application programs designed for the purpose of performing various tasks that can be processed by the controller 330, and upon request from the controller 330, may selectively provide some of the stored application programs. Program or the like stored in the storage unit 320 is not particularly limited as long as it can be executed by the controller 330.

FIG. 3 shows an embodiment in which the storage unit 320 is provided separately from the controller 330, but the scope of the present disclosure is not limited thereto, and the storage unit 320 may be included in the controller 330.

The storage unit 320 may include at least one of volatile memory (e.g. DRAM, SRAM, SDRAM, etc.), and non-volatile memory (e.g. flash memory, hard disk drive (HDD), solid state drive (SSD), etc.)

The storage unit 320 may store reservation data for at least one content. Here, the reservation data for the content may include a title of the content, a broadcasting date, and a time slot.

Meanwhile, reservation data for content may include broadcasting date and time slot corresponding to a plurality of content providers. Here, the content provider may mean an operator that provides live broadcasting content, and may include a terrestrial broadcasting operator, a satellite broadcasting operator, a cable broadcasting operator, an OTT service operator, and the like. In this case, the content provider may be an operator that provides both broadcast content and VOD content corresponding to the broadcast content.

The storage unit 320 may store pre-learned data, model, algorithm, and the like through machine learning such as deep learning.

The controller 330 may be connected to each component provided in the server 300, and may control overall operation of each component. The controller 330 may transmit/receive data with each component provided in the server 300.

The controller 330 may transmit/receive various signals including data with the image display apparatus 100 and/or the mobile device 400 through the communication unit 310.

The controller 330 may receive a signal (hereinafter, a watching reservation signal) for setting watching reservation for specific content from the image display apparatus 100 and/or the mobile device 400. Here, the watching reservation signal may include a title of specific content and a broadcasting date and time slot of the specific content.

When a watching reservation signal is received, the controller 330 may check at least one content provider that provides a service related to the watching of specific content. For example, the controller 330 may check whether at least one content provider provides a service related to the watching of specific content by performing web crawling on each web page of at least one content provider. For example, the controller 330 may check whether at least one content provider provides a service related to the watching of specific content by using an application programming interface (API) corresponding to each of the at least one content provider.

The controller 330 may check broadcasting date and time slot for providing live broadcasting content for each of at least one content provider. In this case, when the content provider provides VOD content corresponding to the broadcast content, the controller 330 may also check the date and time the VOD content is provided.

The controller 330 may generate reservation data for specific content, and store the generated reservation data in the storage unit 320.

The controller 330 may transmit a notification message regarding watching of specific content to the image display apparatus 100 and/or mobile device 400, when a time corresponding to the broadcasting date and time slot of specific content reserved for watching arrives. Here, the time corresponding to the broadcasting date and time slot may be a broadcasting start time in which broadcast content is provided live, or may be a time prior to the broadcasting start time by a certain time.

Meanwhile, the notification message may include data on a content provider that provides specific content live at a time corresponding to a broadcasting date and time slot, among at least one content provider. Here, the data on the content provider may include the name of the content provider, an identifier, information on a corresponding application, and the like. The controller 330 may receive a response signal corresponding to the notification message from the image display apparatus 100 and/or the mobile device 400. Here, the response signal may be a signal transmitted from the image display apparatus 100 and/or the mobile device 400 when specific content reserved for watching is output from the image display apparatus 100 and/or the mobile device 400.

When receiving a response signal from the image display apparatus 100 and/or the mobile device 400, the controller 330 may delete reservation data for specific content stored in the storage unit 320.

Meanwhile, when a response signal is not received from the image display apparatus 100 and/or the mobile device 400, the controller 330 may transmit an additional notification message to the image display apparatus 100 and/or the mobile device 400 at a certain time later than the time corresponding to the broadcasting date and time slot. Here, the additional notification message may include data on a content provider that provides VOD content corresponding to specific content reserved for watching.

For example, when a response signal is not received from the image display apparatus 100 and/or the mobile device 400, the controller 330 may monitor whether the power state of the image display device 100 is turned on from the time corresponding to the broadcasting date and time slot, and may transmit an additional notification message to the image display device 100 at the time when the power state of the image display device 100 is turned on.

Figure 4:
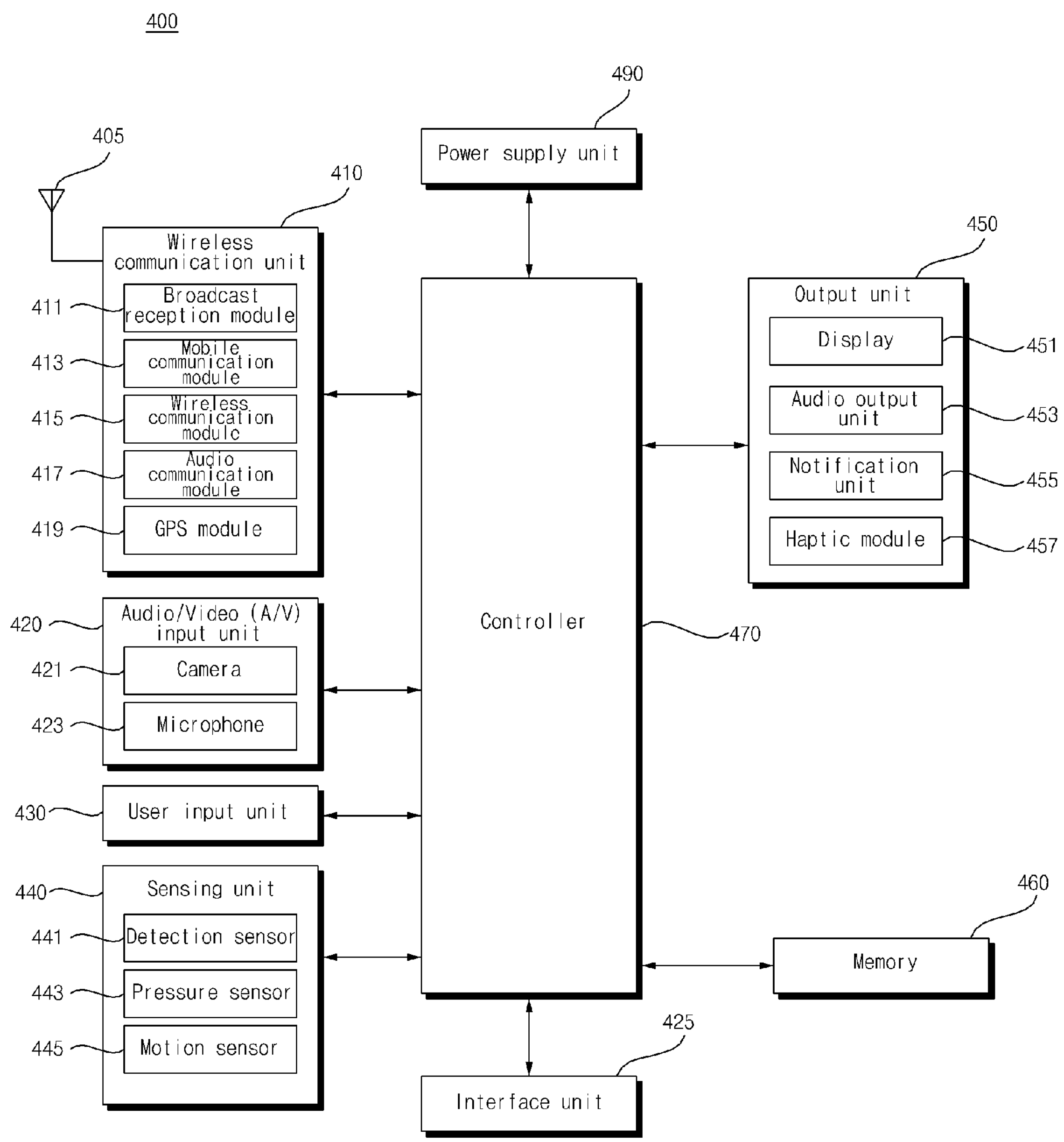
FIG. 4 is an example of an internal block diagram of a mobile device of FIG. 1.

FIG. 4 is an example of an internal block diagram of the mobile device of FIG. 1.

Referring to FIG. 4, the mobile device 400 may include a wireless communication unit 410, an audio/video (A/V) input unit 420, a user input unit 430, a sensing unit 440, an output unit 450, a memory 460, an interface unit 425, a controller 470, and/or a power supply unit 490.

Meanwhile, the wireless communication unit 410 may include a broadcast reception module 411, a mobile communication module 413, a wireless communication module 415, an audio communication unit 417, a GPS module 419, and the like.

The broadcast reception module 411 may receive a broadcast signal from an external broadcast management server through a broadcast channel. In this case, the broadcast channel may include a satellite channel, a terrestrial channel, and the like.

Broadcast data received through the broadcast reception module 411 may be stored in the memory 460.

The mobile communication module 413 may transmit and receive a wireless signal with at least one of a base station, an external terminal, and a server on a mobile communication network. Here, the wireless signal may include a voice call signal, a video call signal, or various types of data according to text/multimedia message transmission/reception.

The wireless communication module 415 may mean a module for wireless Internet access, and the wireless communication module 415 may be internal or external to the mobile device 400. For example, the wireless communication module 415 may perform a wireless communication based on Wi-Fi or a wireless communication based on Wi-Fi Direct.

In addition, as a short-range communication technology, Bluetooth, Radio Frequency Identification (RFID), Infrared Data Association (IrDA), Ultra-Wideband (UWB), ZigBee, and the like may be used.

The audio communication unit 417 may perform audio communication. The audio communication unit 417 may add certain data to a sound to be output in a sound communication mode, and output the sound. In addition, the audio communication unit 417 may extract certain data from the sound received from the outside in the sound communication mode.

The Global Position System (GPS) module 419 may receive location information from a plurality of GPS satellites.

The Audio/Video (A/V) input unit 420 is for inputting an audio signal and/or a video signal, and may include a camera 421 and a microphone 423.

The user input unit 430 may generate key input data that is input by a user to control the operation of a terminal. To this end, the user input unit 430 may be configured of a key pad, a dome switch, a touch pad (resistive/capacitive), and the like. In particular, when the touch pad forms a mutual layer structure with the display 451, it may be referred to as a touch screen.

The sensing unit 440 may generate a sensing signal for controlling the operation of the mobile device 400 by detecting the current state of the mobile device 400, such as the open/closed state of the mobile device 400, the location of the mobile device 400, and the contact with a user.

The sensing unit 440 may include a detection sensor 441, a pressure sensor 443, a motion sensor 445, and the like. The motion sensor 445 may detect the movement or location of the mobile device 400 by using an acceleration sensor, a gyro sensor, or a gravity sensor. In particular, the gyro sensor is a sensor that measures an angular velocity, and may detect a direction (angle) returned to a reference direction.

The output unit 450 may include a display 451, an audio output unit 453, a notification unit 455, and a haptic module 457.

The display 451 may display and output a signal processed by the mobile device 400.

Meanwhile, as described above, when the display 451 and the touch pad form a mutual layer structure to configure a touch screen, the display 451 may be used as an input device capable of inputting information by a user's touch, in addition to an output device.

The audio output unit 453 may output audio data that is received from the wireless communication unit 410 or stored in the memory 460. The audio output unit 453 may include a speaker, a buzzer, and the like.

The notification unit 455 may output a signal for notifying occurrence of an event of the mobile device 400. For example, a signal may be output in the form of a vibration.

The haptic module 457 generates various tactile effects that a user can feel. A representative example of a tactile effect generated by the haptic module 457 is a vibration effect.

The memory 460 may store programs for the processing and control of the controller 470, and may perform a function for temporarily storing input or output data (e.g. phonebook, message, still image, video, etc.)

The interface unit 425 serves as an interface with all external devices connected to the mobile device 400. The interface unit 425 may receive data or receive power from such an external device and transmit to each component inside the mobile device 400, and transmit the data inside the mobile device 400 to the external device.

The controller 470 controls the overall operation of the mobile device 400 by controlling the operation of each component provided in the mobile device 400. For example, it may perform a related control and processing for voice call, data communication, video call, and the like. In addition, the controller 470 may include a multimedia play module 481 for playing multimedia. The multimedia play module 481 may be configured as hardware inside the controller 470 or as software separately from the controller 470.

The power supply unit 490 receives external power and internal power under the control of the controller 470 and supplies power required for operation of each component.

Meanwhile, the block diagram of the mobile device 400 shown in FIG. 4 is a block diagram for an embodiment of the present disclosure. Each component of the block diagram may be integrated, added, or omitted according to specifications of the mobile device 400 that is actually implemented. That is, if necessary, two or more components may be combined into one component, or one component may be subdivided into two or more components. In addition, functions performed in each block are for explaining an embodiment of the present disclosure, and a specific operation or device does not limit the scope of the present disclosure.

Figure 5:
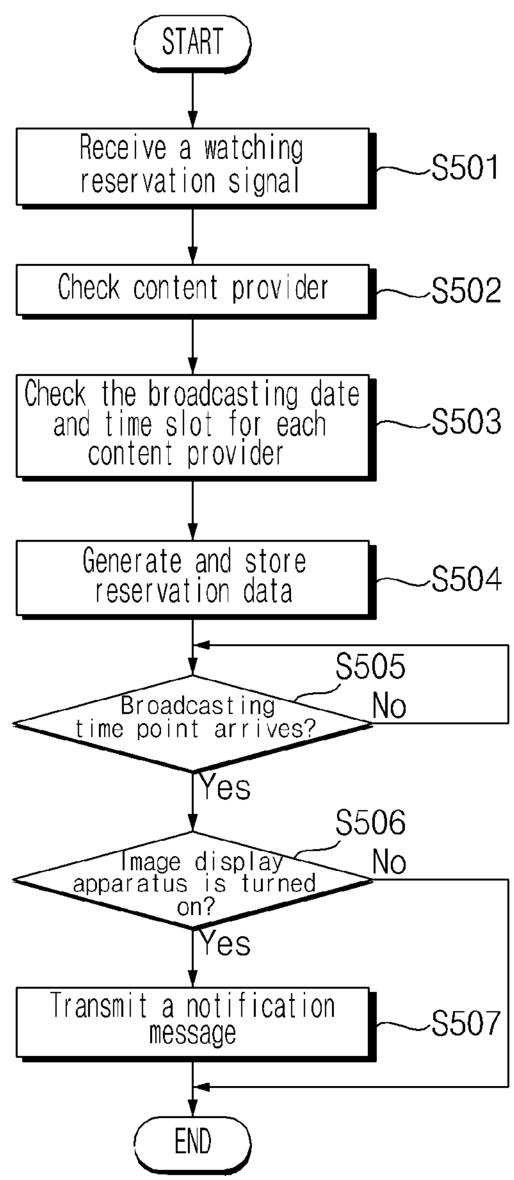
FIG. 5 is a flowchart of a method of operating a server according to an embodiment of the present disclosure.

FIG. 5 is a flowchart of a method of operating a server according to an embodiment of the present disclosure.

Referring to FIG. 5, the server 300 may receive a watching reservation signal for specific content from the image display apparatus 100, at operation S501. At this time, when the watching reservation signal does not include a specific broadcasting date and time slot, the server 300 determines that the broadcasting date and time slot of the specific content, which arrives first from the time when the watching reservation signal is received, is included in the watching reservation signal.

At operation S502, the server 300 may check at least one content provider that provides a service related to watching of specific content. For example, the server 300 may check a terrestrial broadcasting operator, a satellite broadcasting operator, a cable broadcasting operator, an OTT operator, and the like that provide specific content live. In addition, the server 300 may also check an OTT operator that provides VOD content corresponding to specific content.

At operation S503, the server 300 may check the broadcasting date and time slot that provide specific content live for each of the at least one content provider, and also check the date and time when VOD content corresponding to the specific content is provided.

At operation S504, the server 300 may generate and store reservation data for specific content, based on the broadcasting date and time slot for each of the at least one content provider checked at operation S503.

At operation S505, the server 300 may check whether a time point (hereinafter, a first time point) corresponding to the broadcasting date and time slot of the specific content reserved for watching arrives.

At operation S506, the server 300 may check whether the power state of the image display apparatus 100 is a turn-on state, when the first time point reserved for watching arrives. At this time, the server 300 may request the check of the power state to the image display apparatus 100, and may receive a signal (hereinafter, referred to as a state signal) including data on the power state from the image display apparatus 100, or may receive a state signal from the image display apparatus 100 according to a certain period.

At operation S507, when the power state of the image display apparatus 100 is a turn-on state, the server 300 may transmit a notification message including data on content providers, among at least one content provider, that provide specific content live at the first time reserved for watching to the image display apparatus 100.

Figure 6A:
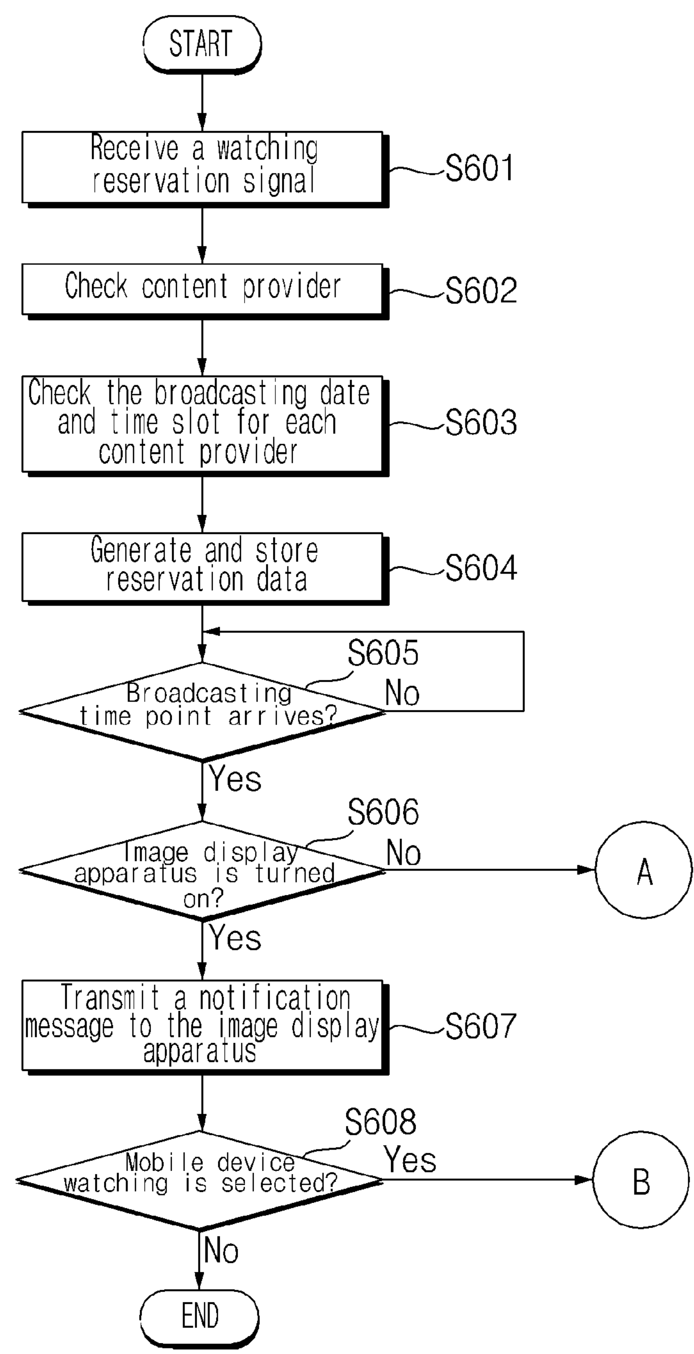
FIGS. 6A and 6B are flowcharts of a method of operating a server according to another embodiment of the present disclosure.
Figure 6B:
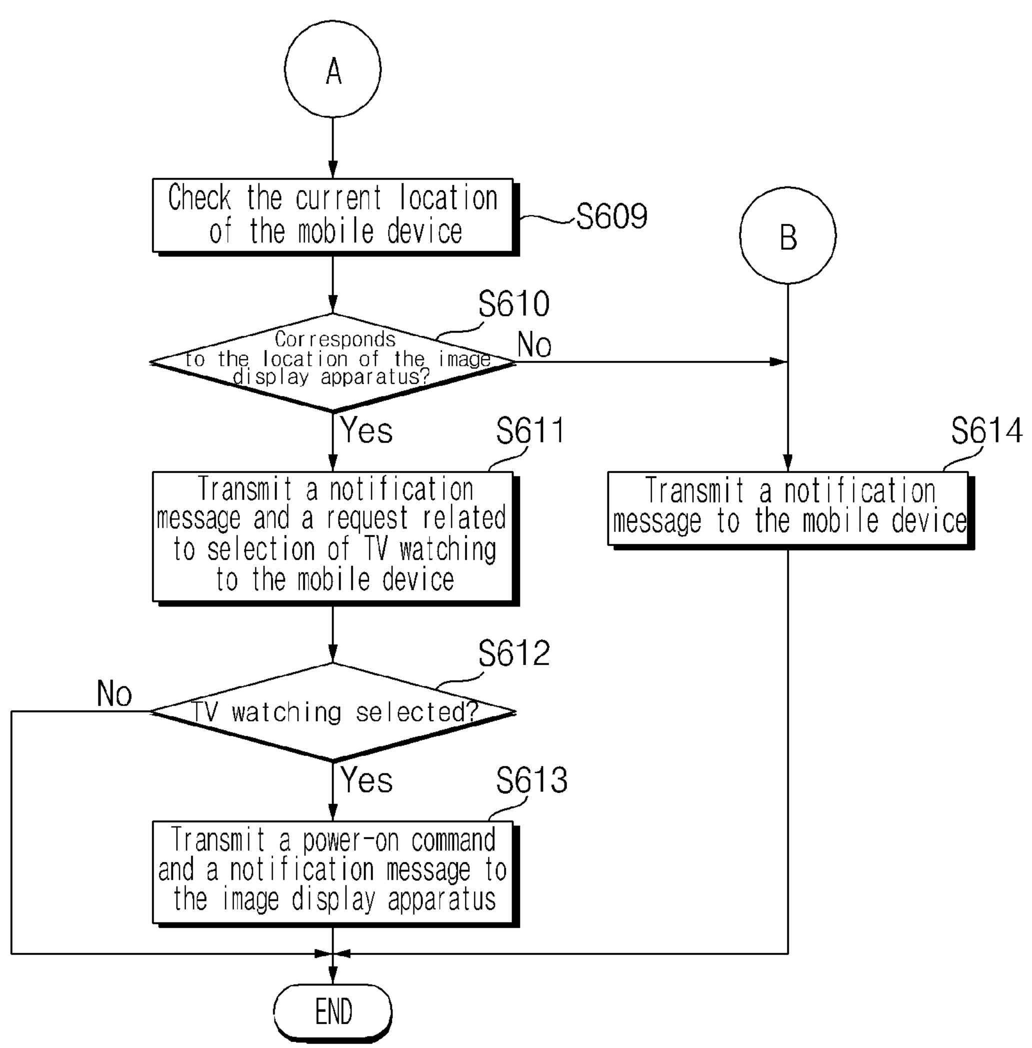

FIGS. 6A and 6B are flowcharts of a method of operating a server according to another embodiment of the present disclosure, and FIGS. 7A to 10 are diagrams for explaining a method of operating a server. Detailed description of content overlapping those described in FIG. 5 will be omitted.

Referring to FIG. 6A, at operation S601, a watching reservation signal for specific content may be received from the image display apparatus 100 and/or the mobile device 400.

Figure 7A:
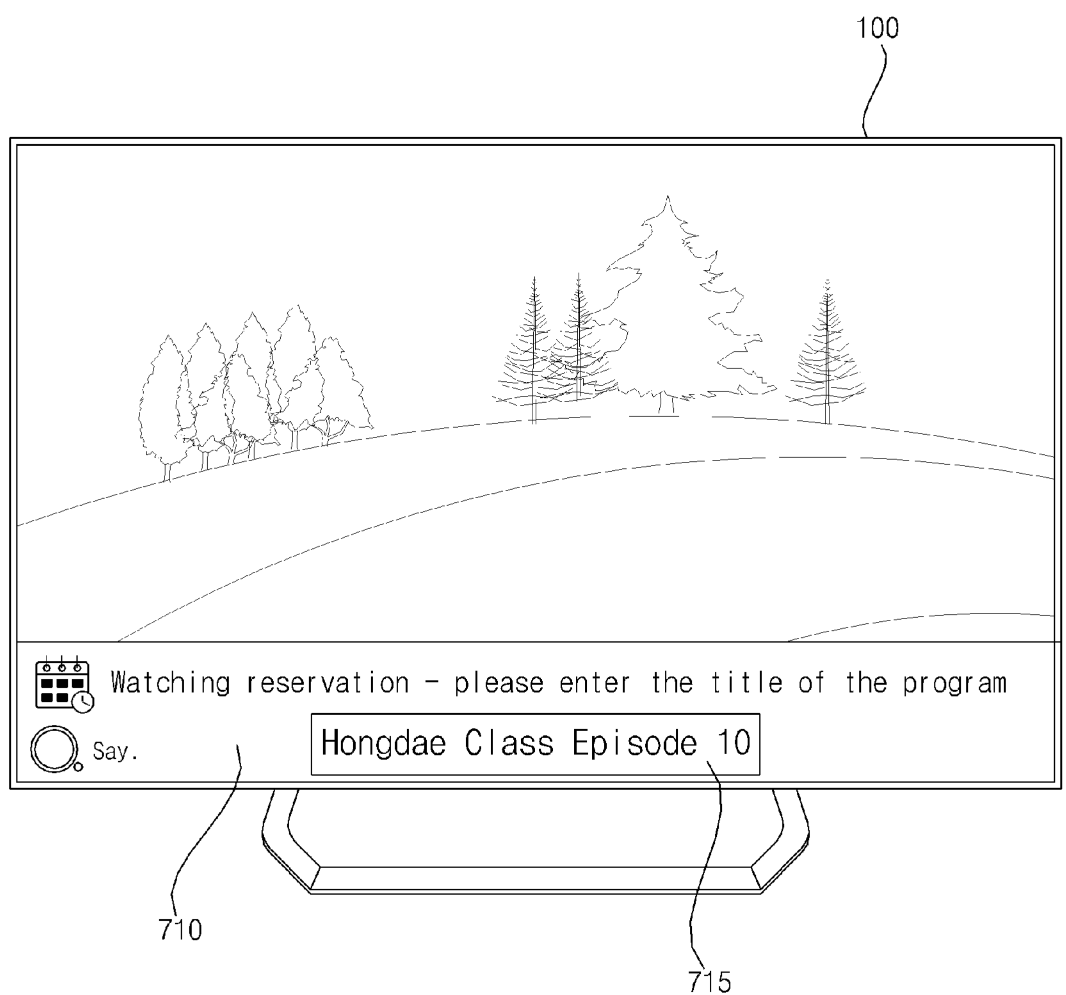
FIGS. 7A to 10 are diagrams for explaining a method of operating a server.

Referring to FIG. 7A, the image display apparatus 100 may output a screen 710 related to a watching reservation function through at least a portion of the display 180. At this time, the screen 710 related to the watching reservation function may include an area 715 for inputting information on specific content that a user wants to watch, and a user inputs the title, reserved episode, broadcasting date, etc. of specific content through the input unit 160 of the remote control device 200 or the image display apparatus 100, thereby reserving watching of specific content.

Figure 7B:
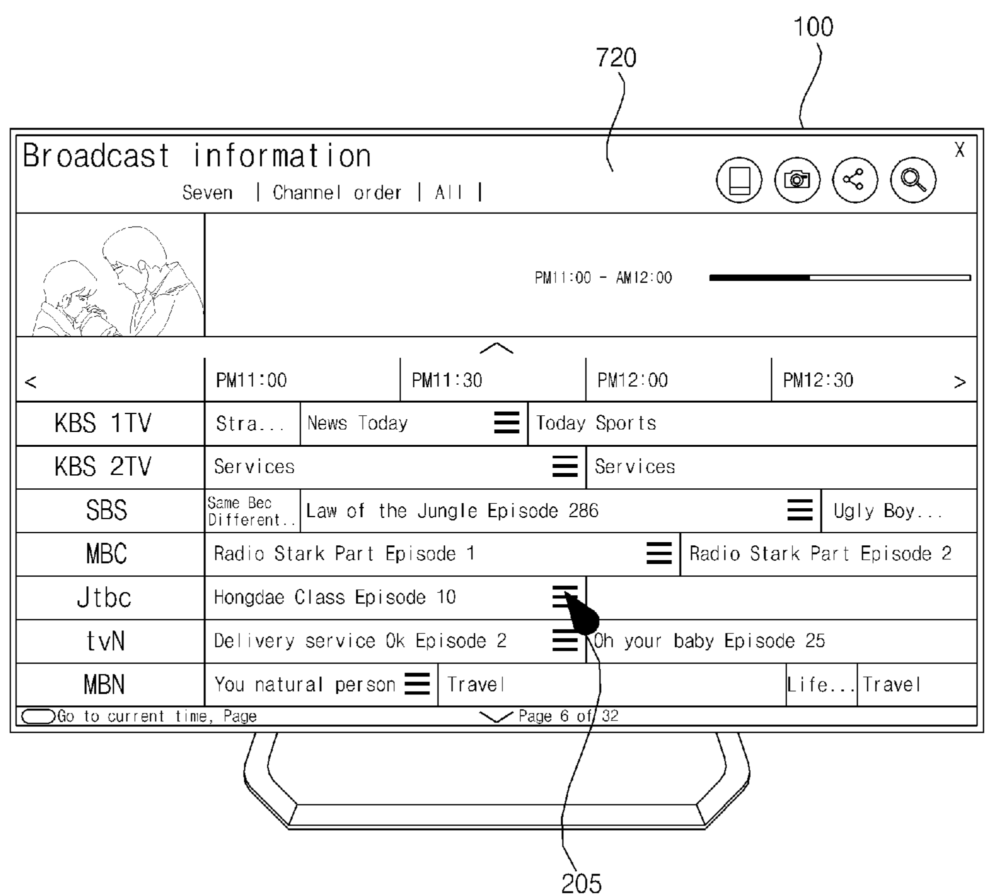

Meanwhile, referring to FIG. 7B, the image display apparatus 100 may output an EPG related screen 720 through the display 180. At this time, a user may reserve watching of specific content by selecting specific content to be watched from among the contents displayed on the EPG, through the pointer 205 corresponding to the remote control device 200.

Meanwhile, when watching of specific content is reserved according to user input, the image display apparatus 100 may transmit a watching reservation signal for specific content including the title, reserved episode, broadcasting date and time slot, etc. of the specific content reserved for watching to the server 300.

Referring back to FIG. 6A, at operation S602, the server 300 may check at least one content provider providing a service related to watching of specific content.

At operation S603, the server 300 may check the broadcasting date and time slot that provide specific content live with respect to each of the at least one content provider, and may also check the date and time when VOD content corresponding to specific content is provided.

At operation S604, the server 300 may generate and store reservation data for specific content, based on the broadcasting date and time slot for each of the at least one content provider checked at operation S603.

At operation S605, the server 300 may check whether the first time point reserved for watching arrives.

At operation S606, the server 300 may check whether the power state of the image display apparatus 100 is a turn-on state, when the first time point reserved for watching arrives.

At operation S607, when the power state of the image display apparatus 100 is a turn-on state, the server 300 may transmit a notification message including data on content providers, among at least one content provider, that provide specific content live at the first time reserved for watching to the image display apparatus 100.

Figure 8A:
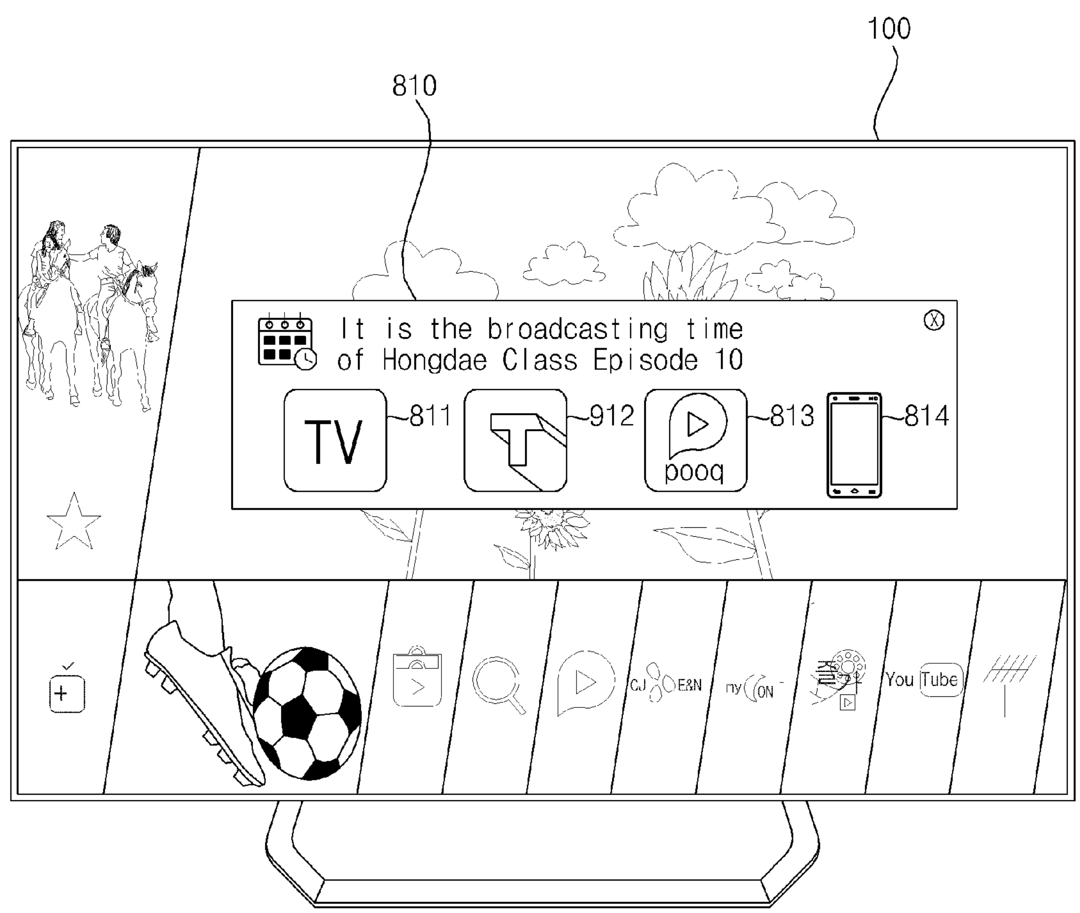
Figure 8B:
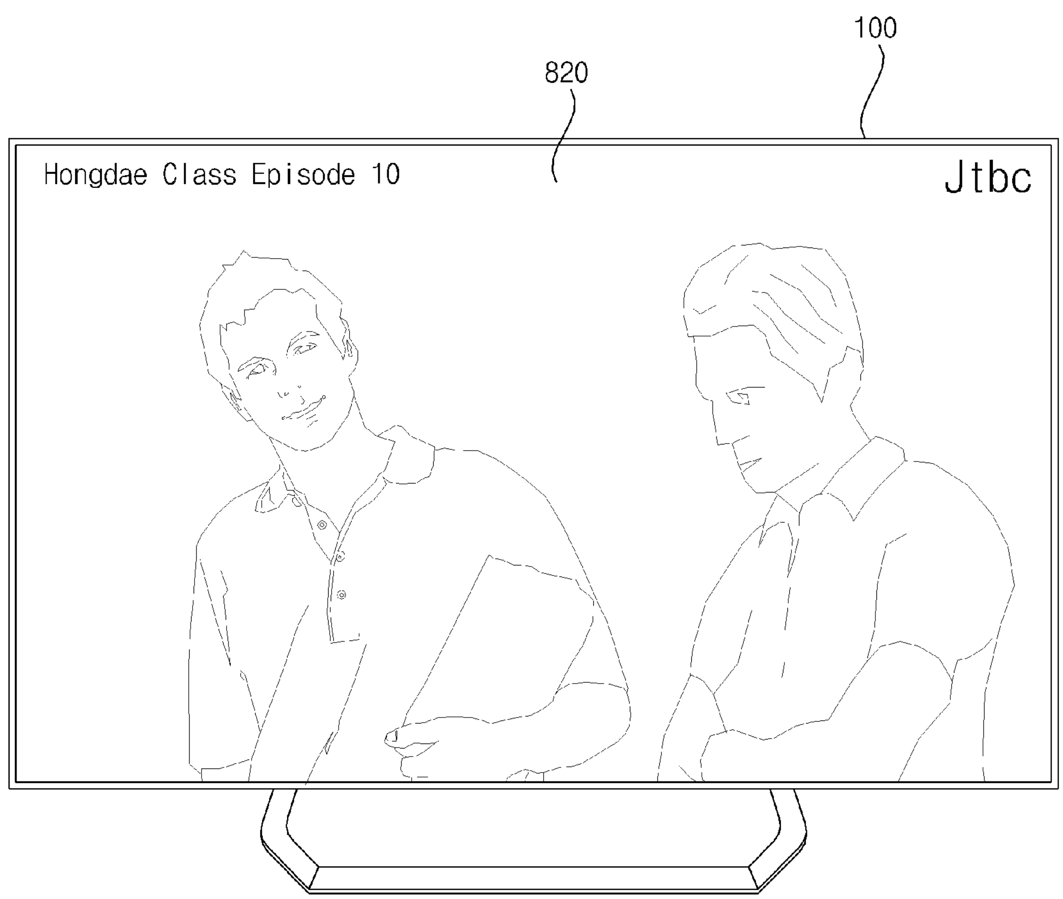

Referring to FIGS. 8A and 8B, when a notification message is received from the server 300, the image display apparatus 100 may output a pop-up screen 810 (hereinafter, a notification screen) notifying a user of the broadcasting time of specific content reserved for watching through the display 180, based on data related to a content provider that provides live specific content included in the notification message.

In this case, the notification screen 810 may be a user interface (UI) screen including at least one item 811 to 813 linked to an application corresponding to each content provider included in the notification message. For example, the notification screen 810 may include an item 811 linked to a TV broadcasting application and an item 812, 813 linked to an OTT service application.

In this case, when a user selects any one of at least one item 811 to 813 linked to an application corresponding to each content provider, the image display apparatus 100 may execute an application corresponding to the selected item, may receive specific content provided live through a service provided by a content provider corresponding to the executed application, and may output a broadcasting screen 820 for the specific content through the display 180.

Meanwhile, the image display apparatus 100 may further contain an item 814 corresponding to the mobile device 400 on the notification screen 810. At this time, when a user selects the item 814 corresponding to the mobile device 400, the image display apparatus 100 may transmit a signal (hereinafter, a mobile watching signal) corresponding to a user input for selecting to watch specific content through the mobile device 400 to the server 300.

Referring back to FIG. 6A, at operation S608, the server 300 may check whether a mobile watching signal is received from the image display apparatus 100. When a mobile watching signal is received from the image display apparatus 100, the server 300 may branch to operation S614, and transmit a notification message to the mobile device 400.

Meanwhile, referring to FIG. 6B, at operation S609, the server 300 may check the current location of the mobile device 400, when the power state of the image display apparatus 100 is a turn-off state. At this time, the server 300 may transmit a request for the check of the current location to the mobile device 400, receive a signal (hereinafter, a location signal) including data on the current location from the mobile device 400, and receive a location signal from the mobile device 400 according to a certain period. Here, the location signal may include location information related to GPS, cell information related to cellular communication, network information of an access point (AP) connected to a network, and the like.

At operation S610, the server 300 may check whether the current location of the mobile device 400 corresponds to the location of the image display apparatus 100. For example, if the GPS location of the mobile device 400 is within a certain distance from the location of the image display apparatus 100, the server 300 may determine that the current location of the mobile device 400 corresponds to the location of the image display apparatus 100.

At operation S611, when the current location of the mobile device 400 corresponds to the location of the image display apparatus 100, the server 300 may transmit a notification message including data on a content provider that provides a specific content live at a first time point reserved for watching, and a request related to selection of whether to watch specific content through the image display apparatus 100 to the mobile device 400.

Figure 9A:
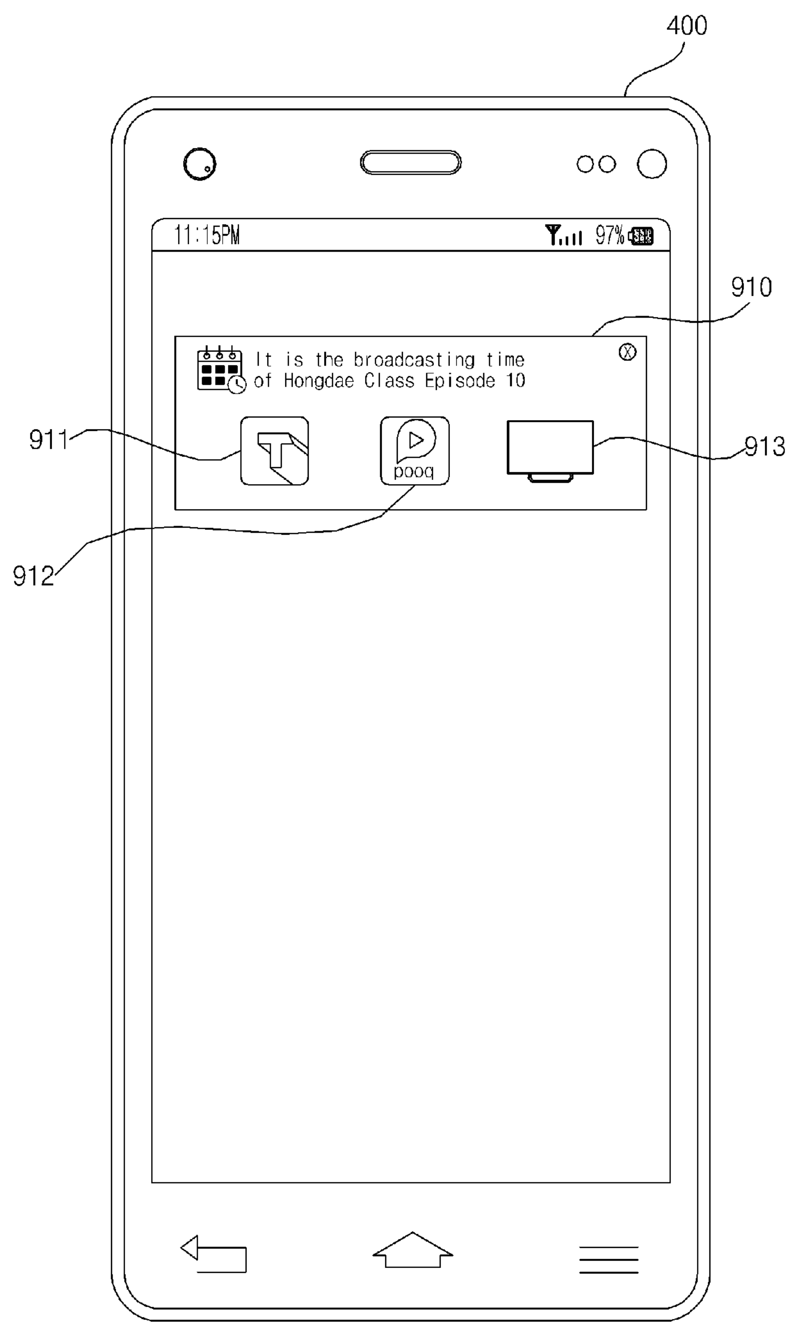
Figure 9B:
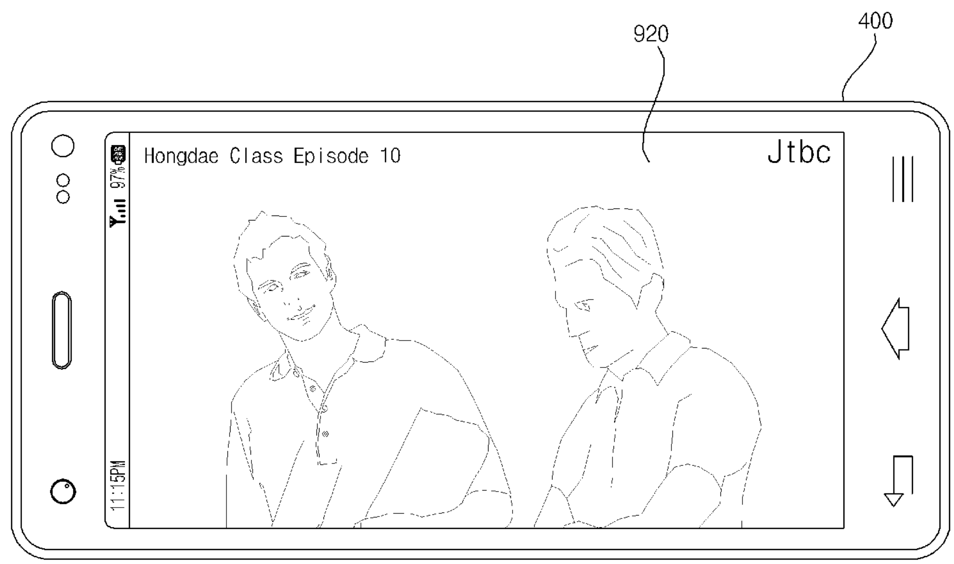

Referring to FIGS. 9A and 9B, when a notification message is received from the server 300, the mobile device 400 may output a notification screen 910 through the display 451, based on data of a content provider that provides live specific content included in the notification message.

In this case, the notification screen 910 may be a UI screen including at least one item 911, 912 linked to an application corresponding to each content provider included in the notification message. Meanwhile, unlike the image display apparatus 100, since the mobile device 400 may not be able to receive a terrestrial broadcasting signal, a cable broadcasting signal, and/or a satellite broadcasting signal, the item 911, 912 linked to an OTT service application executable in the mobile device 400 may be included on the notification screen 910 of the mobile device 400, unlike the notification screen 810 of the image display apparatus 100.

In addition, when a user selects any one of the at least one item 911, 912 linked to an application corresponding to each content provider, the mobile device 400 may execute an application corresponding to the selected item, receive specific content provided live through a service provided by a content provider corresponding to the executed application, and output a broadcasting screen 920 for a specific content through the display 451.

Meanwhile, the mobile device 400 may further contain an item 913 corresponding to the image display apparatus 100 on the notification screen 910. For example, when a request related to selection of whether to watch specific content through the image display apparatus 100 is received from the server 300, the mobile device 400 may further contain the item 913 corresponding to the image display apparatus 100 on the notification screen 910.

At this time, when a user selects the item 913 corresponding to the image display apparatus 100, the mobile device 400 may transmit a signal (hereinafter, a TV watching signal) corresponding to a user input for selecting to watch specific content through the image display apparatus 100 to the server 300.

Again, referring to FIG. 6B, the server 300 may check whether a TV watching signal is received from the mobile device 400, at operation S612.

The server 300 may transmit a power-on command and a notification message to the image display apparatus 100, when a TV watching signal is received from the mobile device 400, at operation S613.

Meanwhile, at operation S614, the server 300 may transmit a notification message to the mobile device 400, when the current location of the mobile device 400 does not correspond to the location of the image display apparatus 100.

Meanwhile, in this drawing, when the power state of the image display apparatus 100 is a turn-off state, it is shown that the server 300 transmits a notification message to the mobile device 400, but the present disclosure is not limited thereto, but may transmit a notification message to the mobile device 400 regardless of the power state of the image display apparatus 100.

Meanwhile, although not shown in the drawing, the server 300 may check whether a response signal corresponding to the notification message is received from the image display apparatus 100 and/or the mobile device 400.

When a response signal is received from the image display apparatus 100, the server 300 may delete reservation data for specific content.

Meanwhile, when a response signal is not received from the image display apparatus 100, the server 300 may transmit an additional notification message containing data on the content provider that provides a VOD content corresponding to a specific content reserved for watching, at a second time point later than the first time reserved for watching to the image display apparatus 100. In this case, the second time point at which the additional notification message is transmitted may be a time when the power state of the image display apparatus 100 is a turn-on state.

Figure 10:
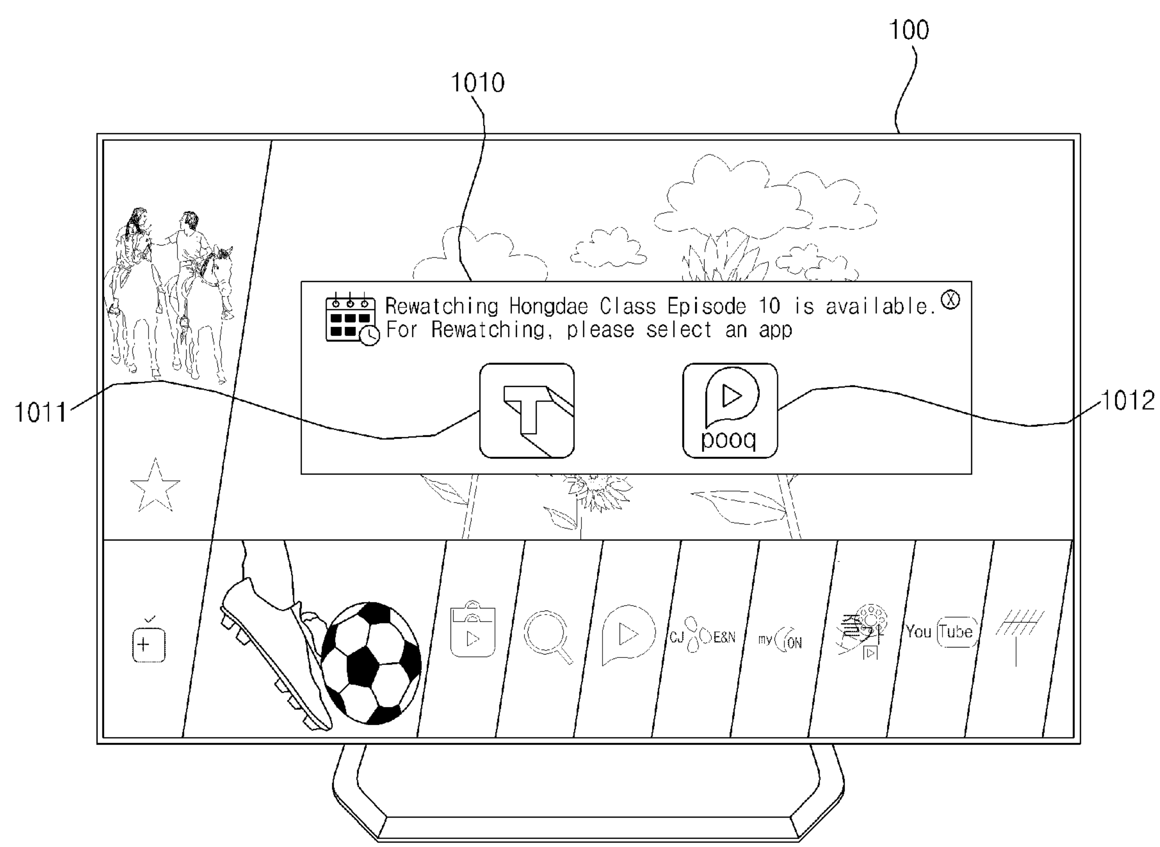

Referring to FIG. 10, when an additional notification message is received from the server 300, the image display apparatus 100 may output a pop-up screen 1010 (hereinafter, a replay notification screen) notifying a user of specific content that has been reserved for watching in the past but has not been watched by the user through the display 180, based on the data on the content provider that provides a VOD content, which is included in the additional notification message, that corresponds to the specific content.

At this time, the replay notification screen 1010 may include at least one item 1011, 1012 linked to an application corresponding to each content provider included in the additional notification message, and a user may select any one of at least one item 1011, 1012 linked to an application corresponding to each content provider.

In addition, the image display apparatus 100 may execute an application corresponding to an item selected by a user, and receive a VOD content corresponding to specific contents through a service provided by a contents provider corresponding to the executed application, and output the VOD content through the display 180.

Figure 11:
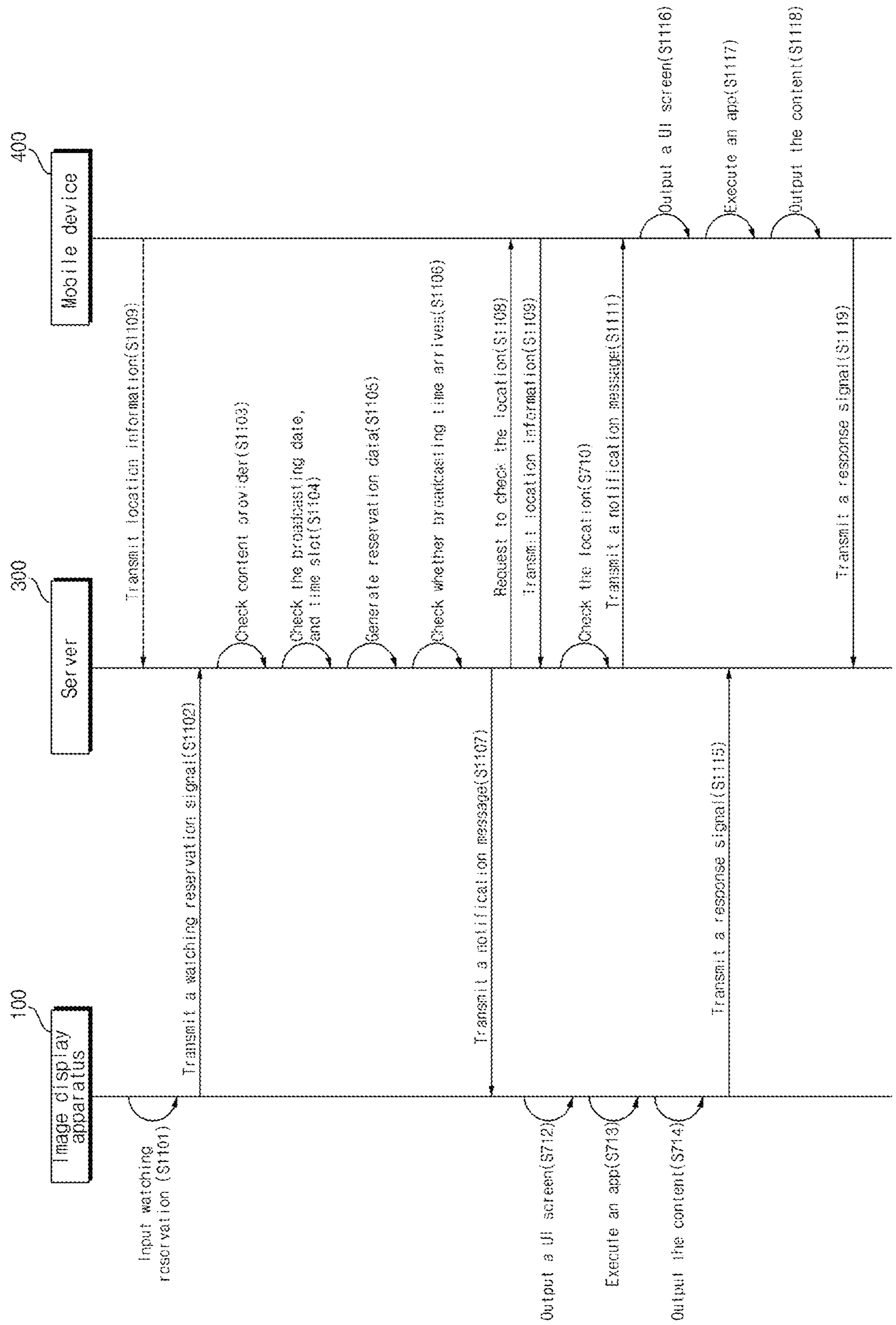
FIG. 11 is a flowchart of an operating method of a system according to an embodiment of the present disclosure.

FIG. 11 is a flowchart of an operating method of a system according to an embodiment of the present disclosure.

Referring to FIG. 11, at operation S1101, the image display apparatus 100 may receive a user input related to watching reservation for specific content, for example, an input related to the title, reserved episode, broadcasting date, and the like of specific content, through the input unit 160 of the remote control device 200 or the image display device 100.

At operation S1102, when watching of a specific content is reserved according to the user input, the image display apparatus 100 may transmit a watching reservation signal for the specific content including the title, reserved episode, broadcasting date, and time slot, etc. of the specific content reserved for watching to the server 300.

At operations S1103 and S1104, the server 300 may check at least one content provider that provides a service related to the watching of specific content, and may check the broadcasting date, and time slot for providing specific content live with respect to each of the at least one content provider.

At operations S1105, the server 300 may generate and store reservation data for specific content, based on the broadcasting date and time slot for each of the at least one content provider checked at operation S1104.

At operation S1106, the server 300 may check whether a first time point reserved for watching arrives.

At operation S1107, the server 300 may transmit a notification message including data on a content provider that provides specific content live at the first time point reserved for watching to the image display apparatus 100.

Meanwhile, at operation S1108, the server 300 may request that the mobile device 400 checks the current location, in order to check the current location of the mobile device 400 at the first time point reserved for watching.

At operation S1109, when the check of the current location is requested from the server 300, the mobile device 400 may transmit a location signal including data on the current location to the server 300. Meanwhile, the mobile device 400 may transmit a location signal to the server 300 according to a certain period.

At operation S1110, the server 300 may check whether the current location of the mobile device 400 corresponds to the location of the image display apparatus 100.

At operation S1111, the server 300 may transmit a notification message to the mobile device 400. At this time, when the current location of the mobile device 400 corresponds to the location of the image display apparatus 100, the server 300 may further transmit, to the mobile device 400, a request related to selection of whether to watch specific content through the image display apparatus Meanwhile, at operation S1112, the image display apparatus 100 may output a notification screen, which is a UI screen including at least one item linked to an application corresponding to each content provider included in the notification message, through the display 180.

At operations S1113 and 1114, when any one of the items included in the notification screen is selected, the image display apparatus 100 may execute an application corresponding to the selected item, and receive specific content provided live through a service provided by a content provider corresponding to the executed application and output the specific content through the display 180.

At operation S1115, when specific content is output through the display 180, the image display apparatus 100 may transmit a response signal corresponding to the notification message to the server 300.

Meanwhile, at operations S1116 to 1118, similar to the image display apparatus 100, the mobile device 400 may output a notification screen, which is a UI screen including at least one item, through the display 451, and when any one of the items included in the notification screen is selected, may execute an application corresponding to the selected item, and may receive specific content provided live through a service provided by a content provider corresponding to the executed application and output the received specific content through the display 451.

In addition, at operation S1119, the mobile device 400 may transmit a response signal corresponding to the notification message to the server 300, when specific content is output through the display 451.

As described above, when a user sets a watching reservation for specific broadcasting content, a server checks and manages information on content providers, respectively, and when the broadcasting time arrives, data of content providers is aggregated and provided to a user, the user can easily set a watching reservation for various content providers at once, thereby improving user convenience.

In addition, according to various embodiments of the present disclosure, since data of content providers related to watching reservations is provided also to a user's mobile device when the broadcasting time arrives, even when a user is absent or is difficult to watch broadcasting content through the image display apparatus, thereby satisfying a user's demand for watching broadcasting content.

In addition, according to various embodiments of the present disclosure, if a user did not watch broadcast content reserved for watching live, or even if the broadcasting time of broadcast content has elapsed, data for a content provider is transmitted to an image display apparatus according to a certain condition, thereby reminding a user of the watching of the broadcasting content to improve the user's satisfaction with the watching reservation function.

Since the accompanying drawings are merely for easily understanding embodiments disclosed herein, it should be understood that the technical spirit disclosed herein is not limited by the accompanying drawings, and all changes, equivalents or substitutions are included in the spirit and technical scope of the present disclosure.

Meanwhile, the operating method of the server and/or system of the present disclosure can be implemented as processor-readable codes in a processor-readable recording medium provided respectively in devices included in the server and/or system. The processor-readable recording medium includes all kinds of recording apparatuses storing data that can be read by a processor. Examples of the processor-readable recording medium is ROM, RAM, CD-ROM, magnetic tapes, floppy disks, optical data storage apparatuses, and, including those that are implemented in the form of carrier waves such as data transmission through the Internet. In addition, the processor-readable recording medium is dispersed in computer systems connected through a network, so that the processor-readable code can be stored and executed in a distributed fashion.

In addition, although the present disclosure has been described with reference to specific embodiments shown in the drawings, it is apparent to those skilled in the art that the present description is not limited to those exemplary embodiments and is embodied in many forms without departing from the scope of the present disclosure, which is described in the following claims. These modifications should not be individually understood from the technical spirit or scope of the present disclosure.

The invention claimed is:

1. A server comprising:

a transceiver configured to perform communication through a network;

a storage device configured to store reservation data including a title, broadcasting date, and time slot of content; and a controller configured to:

when a first signal for setting a watching reservation for specific content is received from an image display apparatus through the transceiver, check a plurality of content providers that provide a service related to watching of the specific content, check a broadcasting date and a time slot of the specific content with respect to each of the plurality of content providers, generate reservation data, which contains a title, the broadcasting date, and the time slot of the specific content, for the specific content and store the reservation data in the storage device;

when a first time point corresponding to the broadcasting date and the time slot of the specific content arrives, determine at least one of the plurality of content providers that provides the specific content live at the first time point; and transmit a notification message, which contains data on the at least one of the plurality of content providers, that is related to watching of the specific content to the image display apparatus, wherein each of the at least one of the plurality of content providers corresponds to an item included in a first screen output through the image display apparatus, the item linked to an application for a service providing the specific content live.

2. The server of claim 1, wherein the at least one of the plurality of content providers comprises at least one of a terrestrial broadcasting operator, a satellite broadcasting operator, a cable broadcasting operator, or an Over The Top (OTT) service operator.

3. The server of claim 1, wherein the controller is further configured to delete the reservation data for the specific content when a response signal corresponding to the notification message is received from the image display apparatus, and transmit an additional notification message containing data of a content provider, among the at least one of the plurality of content providers, that provides the specific content at a second time point to the image display apparatus, at the second time point later than the first time point, when the response signal is not received from the first time point for a certain time.

4. The server of claim 3, wherein the second time point is a time when a power of the image display apparatus is turned on after the first time point.

5. A system comprising a server and an image display apparatus, wherein the server is configured to:

check a plurality of content providers that provide a service related to watching of a specific content, when a first signal for setting a watching reservation for the specific content is received from the image display apparatus through a transceiver, check a broadcasting date and a time slot of the specific content with respect to each of the plurality of content providers, generate and store reservation data, which contains a title, the broadcasting date, and the time slot of the specific content, for the specific content, when a first time point corresponding to the broadcasting date and the time slot of the specific content arrives, determine at least one of the plurality of content providers that provides the specific content live at the first time point, and transmit a notification message, which contains data on the at least one of the plurality of content providers, that is related to watching of the specific content to the image display apparatus, wherein the image display apparatus is configured to:

transmit the first signal to the server according to a user input, output a first screen including at least one item linked to an application corresponding to each of the at least one of the plurality of content providers, based on the notification message, when the notification message is received from the server, when a first user input for selecting any one of the at least one item included in the first screen is received, execute a first application corresponding to the selected item through the first user input, and receive the specific content live through a service provided by a content provider corresponding to the first application.

6. The system of claim 5, wherein the at least one of the plurality of content providers comprises at least one of a terrestrial broadcasting operator, a satellite broadcasting operator, a cable broadcasting operator, or an Over The Top (OTT) service operator.

7. The system of claim 5, further comprising a mobile device, wherein the image display apparatus is further configured to:

output the first screen including an item corresponding to the mobile device, and when a user input for selecting an item corresponding to the mobile device is received, transmit a second signal for selecting to watch the specific content through the mobile device to the server, wherein the server is further configured to transmit the notification message to the mobile device, when the second signal is received from the image display apparatus.

8. The system of claim 5, wherein the image display apparatus is further configured to:

determine a specific content provider from among the at least one of the plurality of content providers contained in the notification message, based on history data related to content watching, output a screen of an application corresponding to the specific content provider instead of the first screen, and receive the specific content live through a service provided by the specific content provider.

9. The system of claim 5, wherein the server is further configured to:

delete the reservation data for the specific content when a response signal corresponding to the notification message is received from the image display apparatus, monitor whether a power of the image display apparatus is turned on, when the response signal is not received from the first time point for a certain time, and transmit an additional notification message containing data of a content provider, among the at least one of the plurality of content providers, that provides the specific content at a second time point to the image display apparatus, at the second time point when the power of the image display apparatus is turned on after the first time point.

10. The server of claim 1, wherein the controller is further configured to:

when the first time point corresponding to the broadcasting date and the time slot of the specific content arrives, determine whether a power state of the image display apparatus is a turn-off state or a turn-on state, transmit the notification message to the image display apparatus, based on the power state being the turn-on state, check a current location of a mobile device, based on the power state being the turn-off state, transmit the notification message and a request related to selection on whether to watch the specific content through the image display apparatus to the mobile device, based on the current location of the mobile device corresponding to the image display apparatus, and transmit the notification message without the request to the mobile device, based on the current location of the mobile device not corresponding to the image display apparatus.

11. The system of claim 5, further comprising a mobile device, wherein the server is further configured to:

when the first time point corresponding to the broadcasting date and the time slot of the specific content arrives, determine whether a power state of the image display apparatus is a turn-off state or a turn-on state, transmit the notification message to the image display apparatus, based on the power state being the turn-on state, check a current location of the mobile device, based on the power state being the turn-off state, transmit the notification message and a request related to selection on whether to watch the specific content through the image display apparatus to the mobile device, based on the current location of the mobile device corresponding to the image display apparatus, and transmit the notification message without the request to the mobile device, based on the current location of the mobile device not corresponding to the image display apparatus.

12. The server of claim 10, wherein the controller is further configured to transmit the notification message to the mobile device, when a second signal corresponding to a user input for selecting to watch the specific content through the mobile device is received from the image display apparatus.

13. The server of claim 10, wherein the controller is further configured to, when a third signal for selecting to watch the specific content through the image display apparatus is received from the mobile device, transmit a command to turn on a power of the image display apparatus and the notification message to the image display apparatus.

14. The system of claim 11, wherein the mobile device is configured to, when the notification message is received from the server, output a second screen related to watching of the specific content, based on the notification message.

15. The system of claim 14, wherein the second screen is a user interface screen including at least one item linked to an application corresponding to each of the at least one of the plurality of content providers contained in the notification message, that is executable in the mobile device, and wherein the mobile device is further configured to:

when a second user input for selecting any one of the at least one item included in the second screen is received, execute a second application corresponding to the selected item through the second user input, and receive the specific content live through a service provided by a content provider corresponding to the second application.

16. The system of claim 15, wherein the server is further configured to:

transmit a command to turn on a power of the image display apparatus and the notification message to the image display apparatus, when a third signal for selecting to watch the specific content through the image display apparatus is received from the mobile device, wherein the mobile device is further configured to:

output the second screen including an item corresponding to the image display apparatus, when the request is received from the server, and transmit the third signal to the server, when a user input for selecting an item corresponding to the image display apparatus is received.

* * * * *